United States Patent [19]
Yaacov et al.

[11] Patent Number: 5,237,330
[45] Date of Patent: Aug. 17, 1993

[54] INTRUSION DETECTION DEVICE

[75] Inventors: Kotlicki Yaacov, Ramat Gan; Moshe Kotlicki, Tsahala; Alexander Baber, Holon, all of Israel

[73] Assignee: Visonic Ltd., Tel Aviv, Israel

[21] Appl. No.: 883,292

[22] Filed: May 14, 1992

[30] Foreign Application Priority Data

Nov. 27, 1991 [IL] Israel .................................... 100173

[51] Int. Cl.$^5$ ............................................. G01S 13/56
[52] U.S. Cl. ........................................ 342/28; 342/53
[58] Field of Search ............................ 342/27, 28, 53

[56] References Cited

U.S. PATENT DOCUMENTS 4,317,117 2/1982 Chasek .................................... 342/53
4,731,611 3/1988 Muller et al. .......................... 342/28

OTHER PUBLICATIONS

Perkins, T. O. III; Active Microstrip Circular Patch Antenna; Microwave Journal; vol. 30 (Mar. 1987), pp. 109-117.
RCA Review, vol. 47, December 1986, Ultrastable Low-Noise GaAs FET Oscillator with Dielectric Resonator, pp. 472 to 487.
IEEE, A. S. P. Khanna, Review of Dielectric Resonator Oscillator Technology, pp. 478 to 486.
IEEE Transactions On Microwave Theory And Techniques, vol. Mtt-26, No. 3, Mar. 1978, pp. 156 to 162.
IEEE Transactions on Microwave Theory and Techniques, vol. Mtt-28, No. 8, Aug. 1980, pp. 817 to 824.
IEEE, A 10.5 GHz MIC Direction Sensitive Doppler Module Using A GaAs FET and A Ag/Pd Thick Film, 1981, pp. 319 to 320.

Primary Examiner—T. H. Tubbesing
Attorney, Agent, or Firm—Nixon & Vanderhye

[57] ABSTRACT

Intrusion detection apparatus including a microwave transmitter comprising a generally unshielded dielectric resonating oscillator, whose parasitic field is radiated within a volume and Doppler detection apparatus for sensing received Doppler signals reflected by a moving object within the volume.

4 Claims, 2 Drawing Sheets

INTRUSION DETECTION DEVICE

FIELD OF THE INVENTION

The present invention relates to intrusion detection generally and more particularly to Doppler intrusion detection apparatus and techniques.

BACKGROUND OF THE INVENTION

Various types of Doppler intrusion detection devices are known. For example, there is described in an article entitled: "A 10.5 GHz MIC DIRECTION SENSITIVE DOPPLER MODULE USING A GaAs FET AND A Ag/Pd THICK FILM" by T. MORI et al in IEEE Publication Code 0149-645X/81/0000-0319$00.75 1981, pp 319-321, a Doppler module employing a dielectric resonator and a waveguide cavity.

Other relevant publications include:

A Highly Stabilized Low-Noise GaAs FET Integrated Oscillator with a Dielectric Resonator in the C Band by H. Abe et al, IEEE Transactions on Microwave Theory and Techniques Vol. MTT-26, No. 3, March 1978;

A Highly Stabilized GaAs FET Oscillator Using a Dielectric Resonator Feedback Circuit in 9-14 GHz by O. Ishihara et al, IEEE Transactions on Microwave Theory and Techniques, Vol. MTT-28, No. 8, August, 1980;

Review of Dielectric Resonator Oscillator Technology, by A. P. S. Khanna, 41st Annual Frequency Control Symposium—1987, Publication Code: CH2427-3/87/0000-478$1.00 1987, pp 478-486;

Ultrastable Low-Noise GaAs FET Oscillator with Dielectric Resonator by G. Lan et al RCA Review, Vol. 47, December, 1986, pp 473-486.

Microwave Doppler radar modules employing fixed frequency Gunn oscillators and mixer cavities are employed generally in Doppler radar systems.

More recently, dielectric resonators have been employed in oscillators in various microwave applications. Due to the relatively large parasitic field produced by dielectric resonator oscillators, they are normally enclosed within a metal box for shielding purposes. Reference is made in this context to U.S. Pat. No. 4,731,611 which describes stripline Doppler radar wherein the oscillator is sealed to prevent RF leakage.

The disclosures of the foregoing references are all incorporated herein by reference.

SUMMARY OF THE INVENTION

The present invention seeks to provide improved Doppler intrusion detection apparatus.

There is thus provided in accordance with a preferred embodiment of the present invention intrusion detection apparatus including a microwave transmitter comprising a generally unshielded dielectric resonating oscillator, whose parasitic field is radiated within a volume and Doppler detection apparatus for sensing received Doppler signals reflected by a moving object within the volume.

Additionally in accordance with an embodiment of the invention, passive infrared detector apparatus may also be provided for detecting the presence of intruders in the volume. The output of the passive infrared detector may be ANDed or ORed with the output of the Doppler detection apparatus.

The volume in which the parasitic field is radiated may extend for several tens of meters, such as 20-50 meters and may cover an azimuth of up to or even exceeding 180 degrees.

BRIEF DESCRIPTION OF A PREFERRED EMBODIMENT

The present invention will be understood and appreciated more fully from the following detailed description, taken in conjunction with the drawing in which.

DETAILED DESCRIPTION OF A PREFERRED EMBODIMENT

Figure 1:
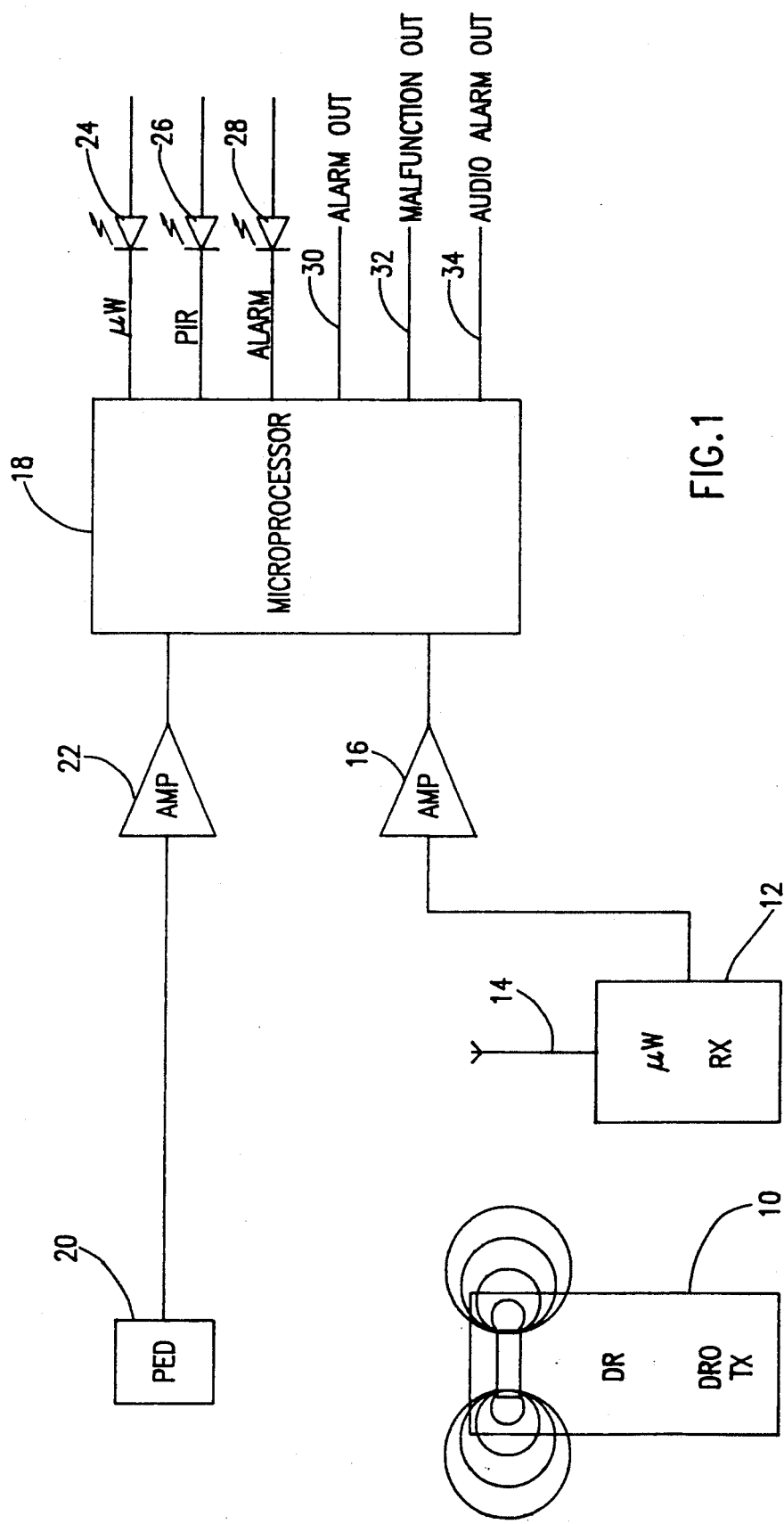
FIG. 1 is a generalized block diagram illustration of an intrusion detector constructed and operative in accordance with a preferred embodiment of the present invention.
Figure 2A:
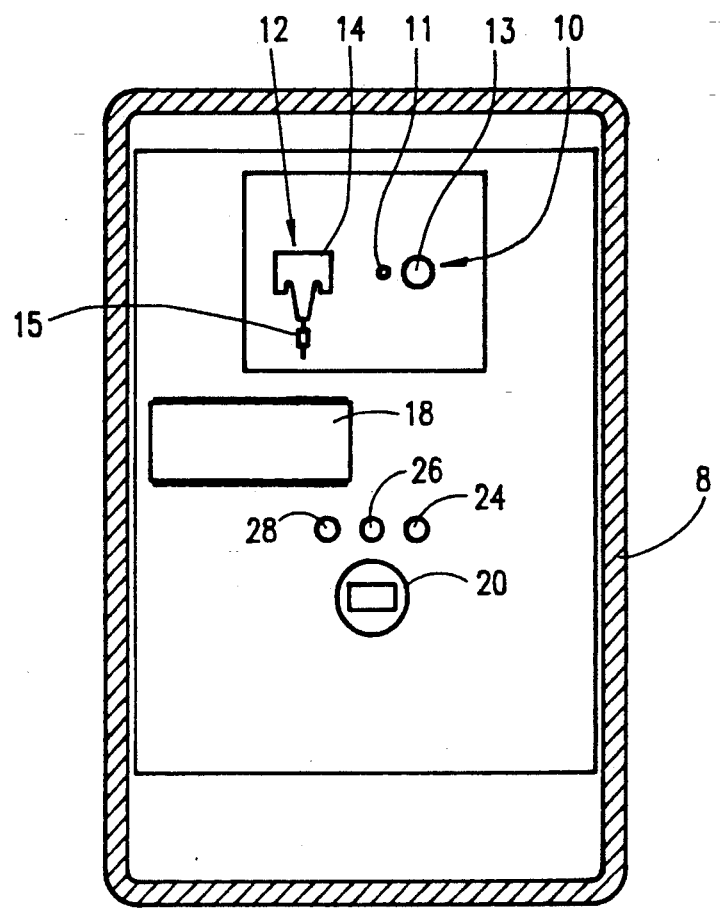
FIG. 2A is a simplified pictorial illustration of the intrusion detector.
Figure 2B:
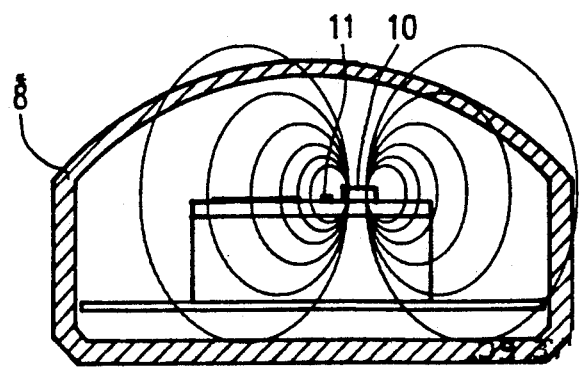
FIG. 2B is a simplified sectional illustration of a microwave portion of the detector of FIG. 2A, showing typical field lines generated by the unshielded dielectric resonator.

Reference is now made to FIGS. 1, 2A and 2B, which illustrate an intrusion detector constructed and operative in accordance with a preferred embodiment of the present invention. Throughout the present specification, the term "intrusion detector" is used in an unusually broad sense to include apparatus and systems which sense the presence of a person in an area, for functions not limited to intrusion detection. Applications of such apparatus and systems may include door opening and utilities management, for example.

The intrusion detector shown in FIG. 2A preferably comprises a housing 8, formed of plastic in which is disposed a transmitter employing a microstrip dielectric resonating oscillator (DRO) 10, preferably incorporating a GaAs FET 11, such as an FSX 51 manufactured by Fujitsu employing a dielectric resonator 13 such as a Type D-8512 manufactured by Trans-Tech Inc. of the U.S.A.

It is a particular feature of the present invention that the dielectric resonating oscillator is employed generally unshielded such that its parasitic field is allowed to radiate into a volume to be protected, such that the dielectric resonator 13 itself serves as a transmitting antenna and no external antenna is provided. For the purposes of the present specification and claims, the term "parasitic field" is used to refer to the field produced by an unshielded dielectric resonating oscillator, as illustrated, for example, by the field lines shown in FIG. 2B.

A microwave Doppler receiving receiver 12 including an antenna 14 and a mixer diode 15, such as a Type DMB3000 manufactured by Alpha Industries Inc. of the U.S.A., provide a detection output via an amplifier 16, such as an LM 358 to a microprocessor 18, such as a Type MC68705R5 manufactured by Motorola. In accordance with a preferred embodiment of the present invention, microprocessor 18 also receives the output of a passive infrared detector such as a pyroelectric detector 20, via an amplifier 22, such as an LM 358.

Microprocessor 18 is coupled to three LED indicators including an indicator 24 which indicates microwave detection, an indicator 26 which indicates passive infrared detection and an indicator 28 which indicates an alarm situation, normally when simultaneous microwave and passive infrared detection is present. The LEDS may be of different colors.

The microprocessor 18 provides an alarm output 30, a malfunction output 32 and an audio alarm output 34.

It will be appreciated by persons skilled in the art that the present invention is not limited by what has been particularly shown and described hereinabove. Rather the scope of the invention is defined only by the claims which follow:

We claim:

1. Intrusion detection apparatus comprising a microwave transmitter including a generally unshielded dielectric resonating oscillator, comprising a dielectric resonator, whose parasitic field is radiated within a volume and Doppler detection apparatus for sensing receiving Doppler signals reflected from a moving object within the volume.

2. Intrusion detection apparatus according to claim 1 and also comprising passive infrared detector means for detecting the presence of intruders in the volume.

3. Intrusion detection apparatus according to claim 1 and wherein said microwave transmitter does not include a waveguide or external antenna.

4. Intrusion detection apparatus according to claim 2 and wherein said microwave transmitter does not include a waveguide or external antenna.

* * * * *

UNITED STATES PATENT AND TRADEMARK OFFICE
CERTIFICATE OF CORRECTION

PATENT NO. : 5,237,330
DATED : August 17, 1993
INVENTOR(S) : Y. Kotlicki et al

It is certified that error appears in the above-indentified patent and that said Letters Patent is hereby corrected as shown below:

On the title page, item [19] "Yaacov et al." should read
--Kotlicki et al.--; and item [75] Inventors: "Kotlicki Yaacov"
should read --Yaacov Kotlicki--.

Signed and Sealed this

Twenty-sixth Day of April, 1994

*Attest:*

BRUCE LEHMAN

*Attesting Officer*    *Commissioner of Patents and Trademarks*